US007766119B2

(12) United States Patent
Yokoi et al.

(10) Patent No.: US 7,766,119 B2
(45) Date of Patent: Aug. 3, 2010

(54) VEHICLE

(75) Inventors: Masato Yokoi, Shizuoka (JP); Shidehiko Miyashiro, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 300 days.

(21) Appl. No.: 12/024,874

(22) Filed: Feb. 1, 2008

(65) Prior Publication Data

US 2008/0184954 A1 Aug. 7, 2008

(30) Foreign Application Priority Data

Feb. 1, 2007 (JP) ............................ 2007-022580
Jan. 10, 2008 (JP) ............................ 2008-003353

(51) Int. Cl.
*B62D 21/00* (2006.01)

(52) U.S. Cl. ....................... 180/311; 180/68.3; 180/312

(58) Field of Classification Search ................. 180/311, 180/68.3, 312
See application file for complete search history.

(56) References Cited

FOREIGN PATENT DOCUMENTS

| | | | |
|---|---|---|---|
| JP | 01-115795 | 5/1989 | |
| JP | 2-296588 | * 12/1990 | ................ 180/68.3 |
| JP | 2005-529030 | 9/2005 | |

* cited by examiner

*Primary Examiner*—Eric Culbreth
(74) *Attorney, Agent, or Firm*—Keating & Bennett, LLP

(57) ABSTRACT

A motorcycle has a head pipe and an engine disposed with its cylinder axis inclined rearward. An intake pipe located between a down tube and the engine is connected to a front part of the engine and includes an engine connecting part connected to a front part of the engine. The engine connecting part is inclined upward to the front to define an acute angle with respect to the cylinder axis of the engine. A funnel is connected to a throttle body and extends upward to the front in a more vertically upward direction than an axis of the throttle body.

11 Claims, 9 Drawing Sheets

VEHICLE

RELATED APPLICATIONS

This application claims the benefit of priority under 35 USC 119 of Japanese patent application no. 2007-022580, filed on Feb. 1, 2007, and Japanese patent application no. 2008-003353, filed on Jan. 10, 2008, which applications are hereby incorporated by reference in their entireties.

BACKGROUND OF THE INVENTION

1. Field of the Invention

The present invention relates to a vehicle having an engine.

2. Description of Related Art

A vehicle having an engine is known. JP-A-Hei 1-115795, for example, discloses a motorcycle having an engine disposed with its cylinder axis substantially extending upward; a carburetor located between the engine and a down tube (lower frame) for supplying fuel to the engine; and a connecting part connected to a front part of the engine for coupling the engine with one end of the carburetor. Although not specified, one end of a funnel part is attached to the other end of the carburetor. Although also not specified, the connecting part is attached to the engine such that it extends substantially perpendicular to the cylinder axis in a direction that the down tube is located (in the forward direction). The funnel part sharply curves upward from the one end toward the other end thereof.

In JP-A-Hei 1-115795, because the funnel part sharply curves upward from one end toward the other end thereof, flow resistance of air that is drawn into the engine disadvantageously increases when the air passes through the funnel part to flow into the connecting part. Thus, there arises a problem of a decrease in intake efficiency of the engine. In addition, the connecting part is attached substantially perpendicular to the cylinder axis. Therefore, a longer distance is needed between the down tube and the engine in order to avoid contact between the funnel part and down tube, creating an additional problem of increased vehicle length.

SUMMARY OF THE INVENTION

The present invention solves the foregoing problems and provides a vehicle without increased length and without decreased engine intake efficiency.

A vehicle according to one aspect of the invention has a head pipe and an engine disposed with a cylinder axis thereof inclined rearward. A lower frame is located in front of the engine and extends downward from the head pipe to the rear. An intake pipe is located between the lower frame and the engine and is connected to a front part of the engine. The intake pipe includes a connecting part connected to a front part of the engine that is inclined upward to the front to define an acute angle with respect to the cylinder axis of the engine. A funnel part is connected to the connecting part and extends upward to the front in a more vertically upward direction than an axis of the connecting part.

In the vehicle according to the invention, as described above, the connecting part of the intake pipe is connected to the front part of the engine and inclines upward to the front to define an acute angle with respect to a cylinder axis of the engine, and the funnel part is connected to the connecting part and extends upward. Thus, the funnel part is not curved as sharply as in a case where the connecting part of the intake pipe is attached perpendicular to the cylinder axis of the engine, thereby allowing the funnel part to extend upward to the front. This prevents an increase in flow resistance of air drawn into the engine and passing through the funnel part, and therefore, prevents a decrease in intake efficiency of the engine. In addition, the connecting part is inclined upward to the front to define an acute angle with respect to the cylinder axis of the engine. Thus, a distance between a lower frame and the engine is shorter, compared to a case where the connecting part of the intake pipe is attached perpendicular to the cylinder axis of the engine. This prevents an increase in vehicle length.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
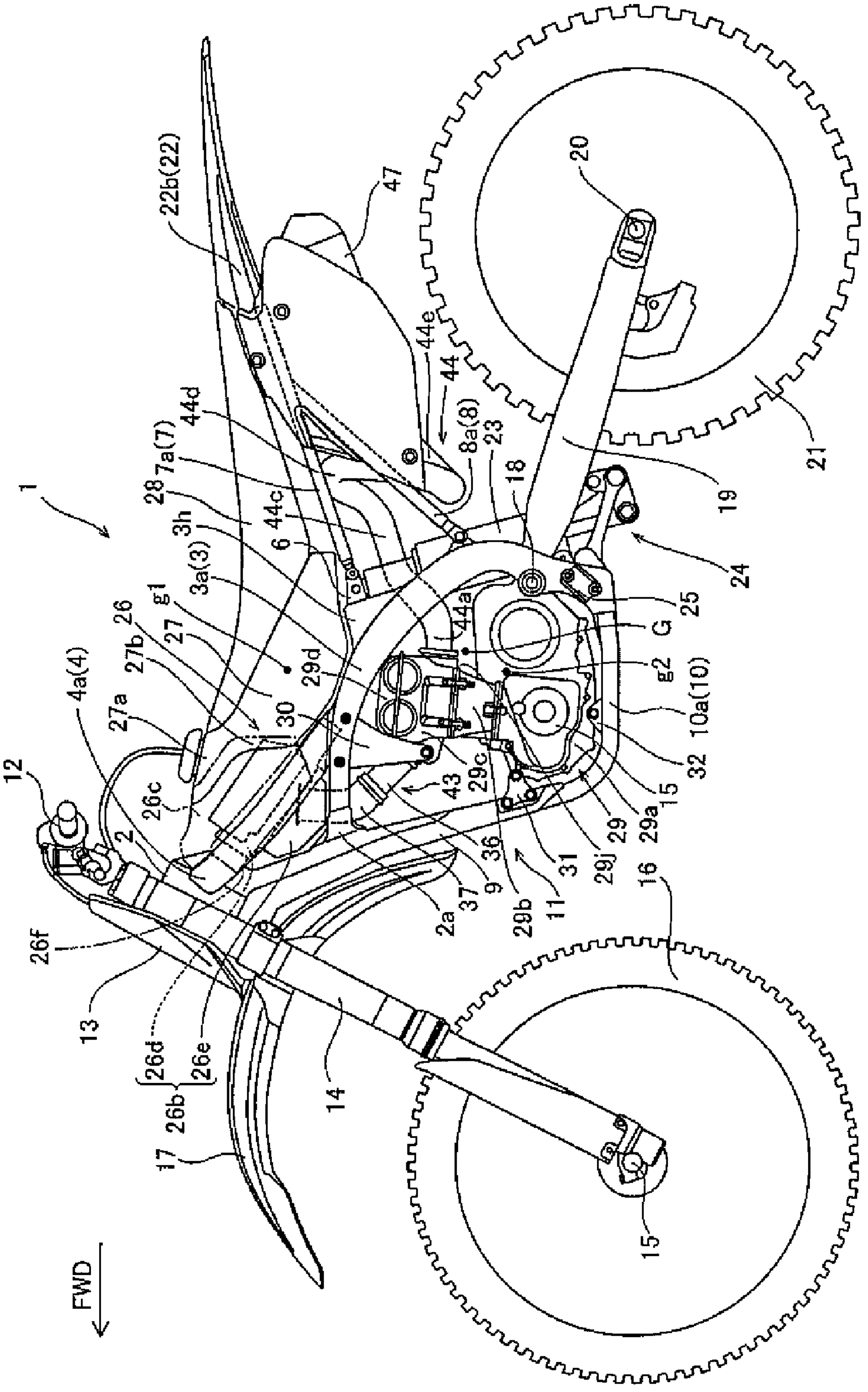
FIG. 1 is a side view of a motorcycle according to a first embodiment of the present invention.

Embodiments of the present invention are now described with reference to the drawings.

First Embodiment

FIGS. 1-6 illustrate a motorcycle 1 according to a first embodiment of the invention. An off-road motorcycle 1 is described as an example of the vehicle of the invention. The direction indicated by arrow FWD in the drawings is a forward traveling direction of motorcycle 1. The structure of motorcycle 1 according to the first embodiment of the invention will be described below with reference to FIGS. 1 to 6. In the following description, directions such as "left", "right", "forward", "rearward", "up" and "down" are from the perspective of a rider facing forward (in the direction of arrow FWD).

Figure 2:
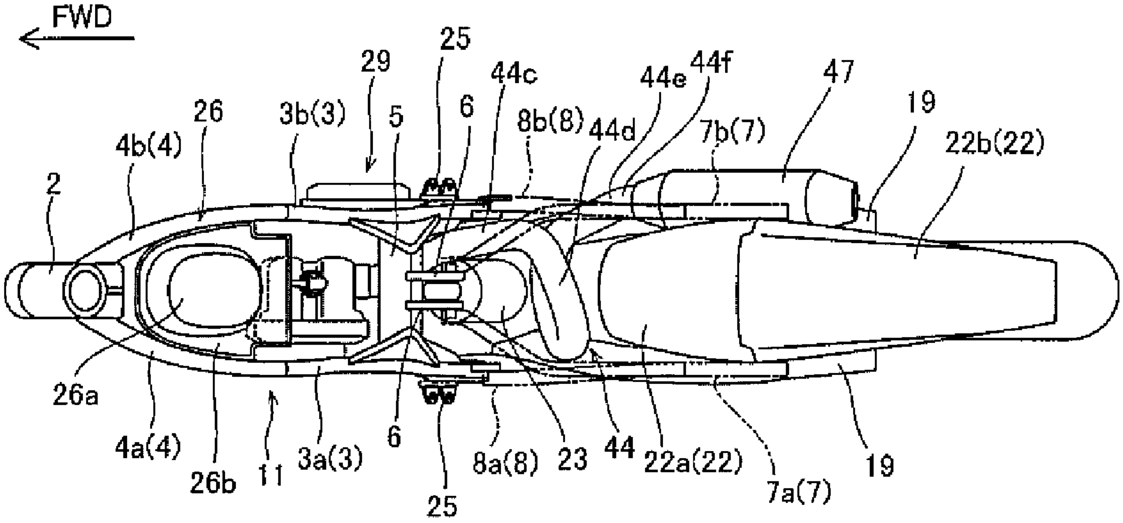
FIG. 2 is a top plan view of the motorcycle of FIG. 1.

Motorcycle 1 includes a body frame 11 comprising a head pipe 2, a main frame 3, a tank rail 4, a seat rail 7, a backstay 8, a down tube 9 and a bottom frame 10. As shown in FIG. 1, left and right frames 3*a* and 3*b* (FIG. 2) of main frame 3 are connected to a connecting part 2*a* of head pipe 2. Frames 3*a* and 3*b* extend downward to the rear. Left and right tank rails 4*a* and 4*b* of tank rail 4 are located between a rear part of head pipe 2 and top parts of frames 3*a* and 3*b*. Tank rail 4 is an example of the "upper frame" of the present invention. As shown in FIG. 2, top rear parts of left and right frames 3*a* and 3*b* are coupled by a connecting member 5. Left rail and right rails 7*a* and 7*b* of seat rail 7 extend upward and rearward and are connected to connecting member 5 through a support 6 formed integral with connecting member 5.

Left and right stays 8*a* and 8*b* of backstay 8 are connected, respectively, between frames 3*a* and 3*b* and seat rails 7*a* and 7*b*. Down tube 9, which is an example of a "lower frame" of the present invention, extends downward and rearward from a bottom part of head pipe 2, and is located in front of engine 29. Left (10*a*) and right bottom frames of bottom frame 10 are located at a bottom end of down tube 9 connect down tube 9 and frames 3*a* and 3*b*.

Handlebars 12 are pivotally disposed on the top of head pipe 2. A front number plate 13 covers the front part of head pipe 2. A pair of front forks 14 are located below head pipe 2. An axle 15 is fixed to bottom ends of front forks 14. A front wheel 16 is rotatably mounted to axle 15. A front fender 17 covers an upper part of front wheel 16.

Figure 3:
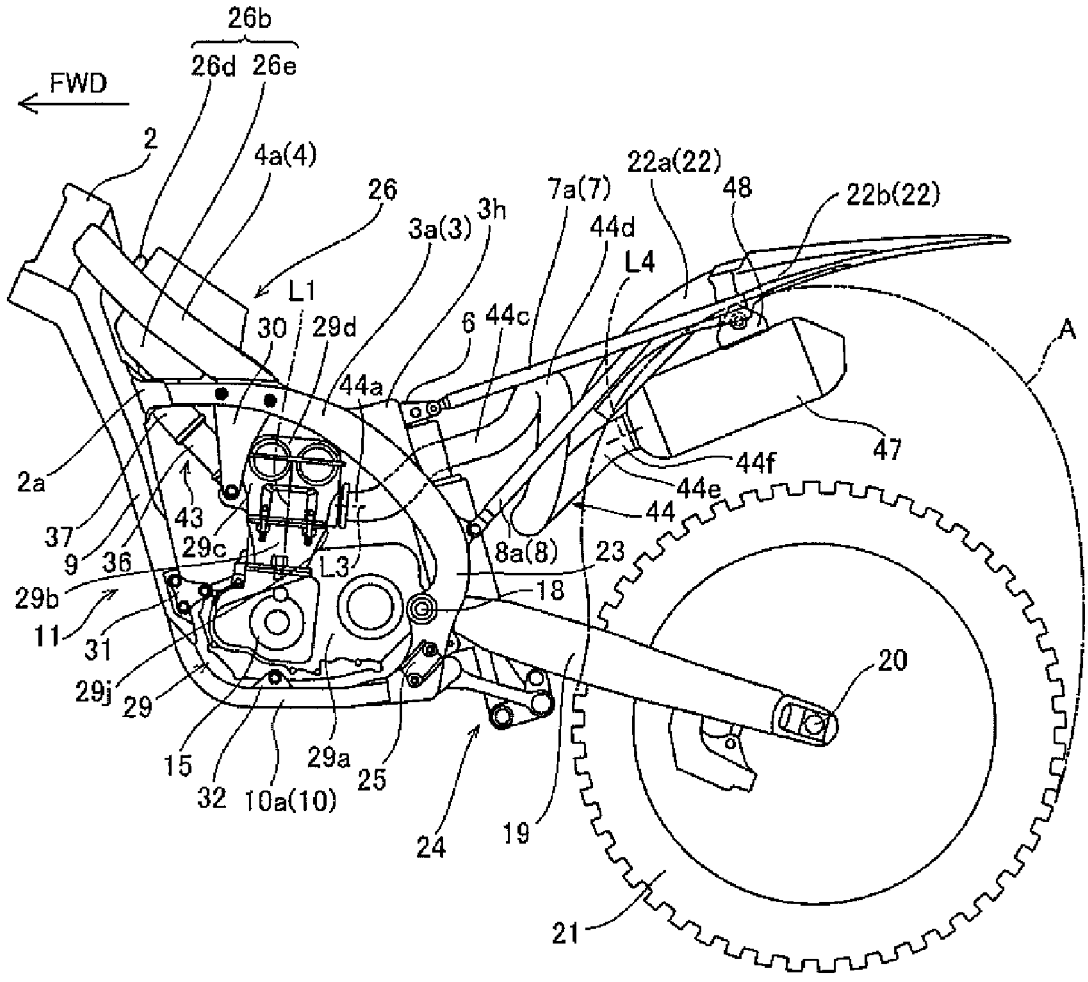
FIG. 3 is a side view of a portion of the motorcycle of FIG. 1.

A pivot shaft 18 provided through main frame 3 supports a rear arm 19 for vertical pivotal movement. A rear wheel 21 is rotatably mounted to an axle 20 fixed to a rear end of rear arm 19. A rear fender 22 covers an upper part of rear wheel 21. As shown in FIG. 3, rear fender 22 comprises a front fender 22*a* and a rear fender 22*b*.

As shown in FIG. 1, a rear suspension 23 disposed at the rear of main frame 3 absorbs shock caused by vertical pivotal movement of rear arm 19. An upper part of the rear suspension 23 is supported by main frame 3 through support 6 (FIG. 2) of connecting member 6, while a lower part of rear suspension 23 is coupled with rear arm 19 through a coupling member 24. Footrest holding plates 25 are fixed to frames 3*a* and 3*b*.

Figure 4:
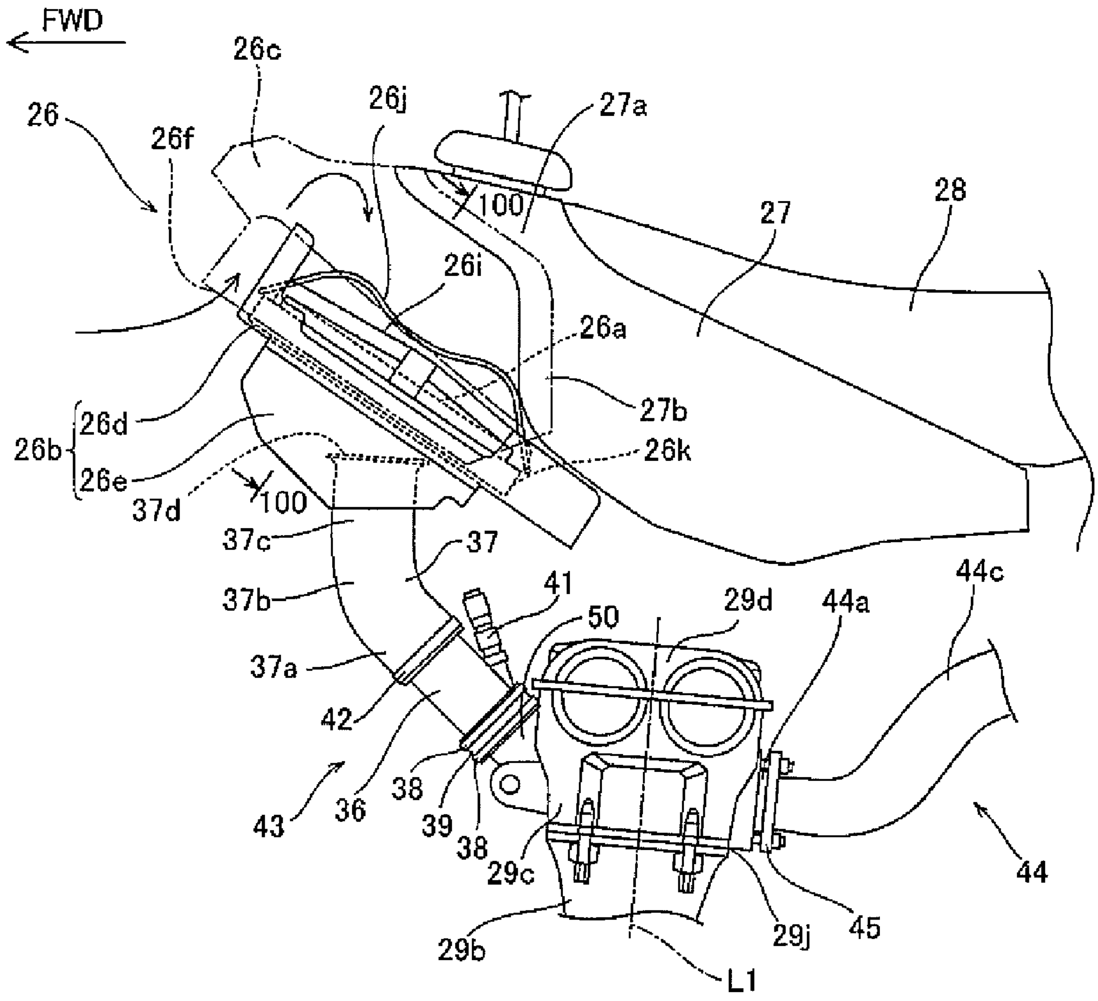
FIG. 4 is a side view of a portion of the motorcycle of FIG. 1 showing an engine, an intake pipe, an air cleaner and surroundings.
Figure 5:
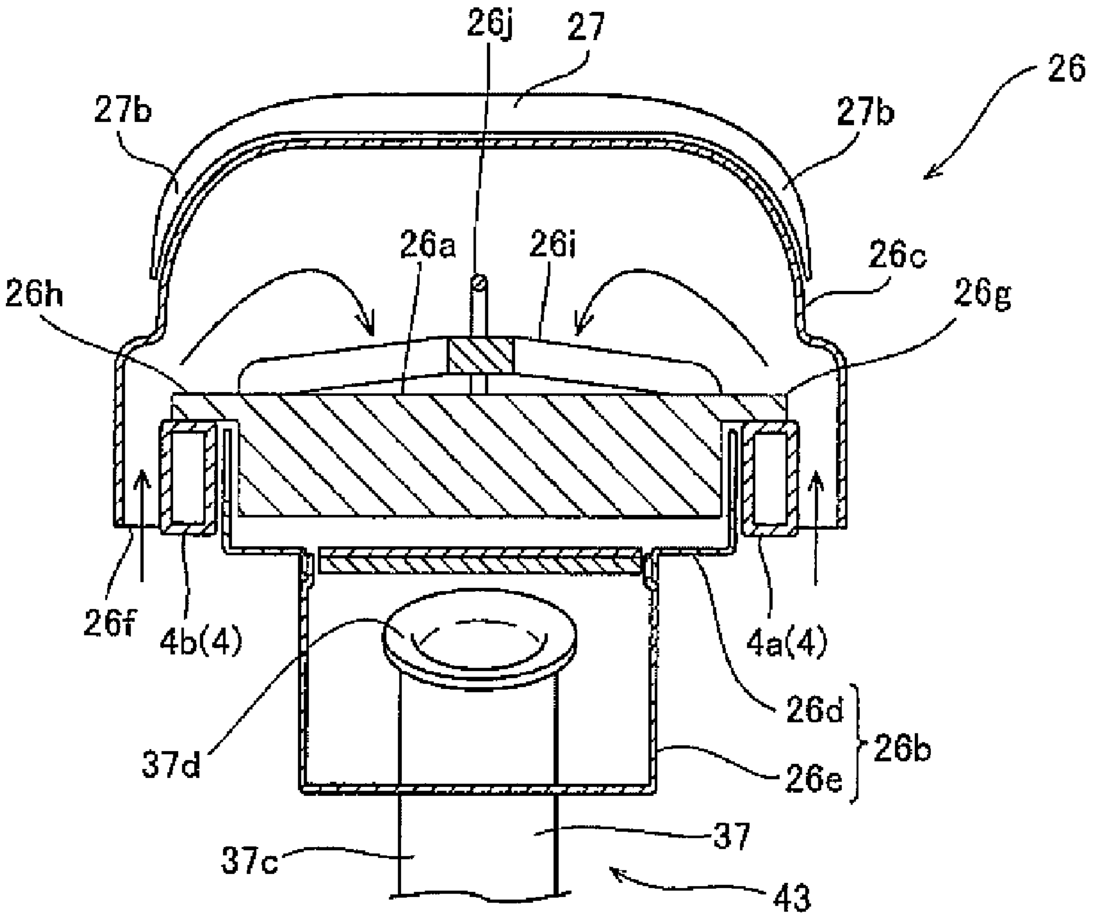
FIG. 5 is a front sectional view of the air cleaner taken through line 100-100 of FIG. 4.

As shown in FIG. 2, an air cleaner 26, to which a funnel 37 is connected, is located between left and right tanks rail 4*a* and 4*b*. As shown in FIG. 1, air cleaner 26 is located in front of and above engine 29. As shown in FIG. 4, air cleaner 26 includes a filter element 26*a* for preventing foreign matter (sand, dust, pebbles and the like) from entering an intake pipe 43; a cleaner case 26*b* within which filter element 26*a* is located; and a cover member 26*c* for covering cleaner case 26*b* from above. Filter element 26*a* is an example of a "filter part" of the present invention. Filter element 26*a* is oriented with its rear part inclined downward. Cleaner case 26*b* includes an upper case part 26*d* to which filter element 26*a* is fixed, and a lower case part 26*e* in which funnel 37 is located. An opening 26*f* formed in a diagonally front lower part of cover member 26*c* allows air to flow therein from the front (FIG. 5). Air enters from opening 26*f* and flows through filter element 26*a* into lower case part 26*e* of cleaner case 26*b*. Opening 26*f* is located rearward from front number plate 13 to prevent entry of foreign matter (water, pebbles and the like) into opening 26*f*. Further, opening 26*f* is located above funnel 37.

As shown in FIG. 5, filter element 26*a* has an overlying part 26*g* on top of right tank rail 4*a*, which lies over right tank rail 4*a* in the width direction. Filter element 26*a* also has an overlying part 26*h* on top of left tank rail 4*b*, which lies over left tank rail 4*b* in the width direction. In addition, filter element 26*a* is supported from above by a pressing member 26*i* located above filter element 26*a*. At the same time, filter element 26*a* is attached to extend so as not to be creased. Above pressing member 26*i*, a wire 26*j* is disposed to press filter element 26*a* against lower case part 26*e*.

A fuel tank 27 made of resin extends rearward from air cleaner 26 (FIG. 4). A center of gravity g1 of fuel tank 27 is close to a center of gravity G of the vehicle, as shown in FIG. 1. In this embodiment of the invention, the center of gravity G of the vehicle is to the rear of the center of gravity g1 of fuel tank 27. Fuel tank 27 includes an upper overlying part 27*a* that lies over an upper part of air cleaner 26 and a side overlying part 27*b* that lies over a side part of air cleaner 26.

A front part of seat 28 is located above a rear part of fuel tank 27. Seat 28 extends to the rear of fuel tank 27.

Engine 29 is located below main frame 3. Engine 29 is fixed by a support plate 30 fastened to main frame 3, a support plate 31 fastened to down tube 9, and a support plate 32 fastened to bottom frame 10. Cylinder axis L1 of engine 29 (FIG. 4) is angled rearward by approximately 5 degrees such that a center of gravity g2 of engine 29 is close to the center of gravity G of the vehicle. The center of gravity G of the vehicle is to the rear of the center of gravity g2 of engine 29.

Figure 8:
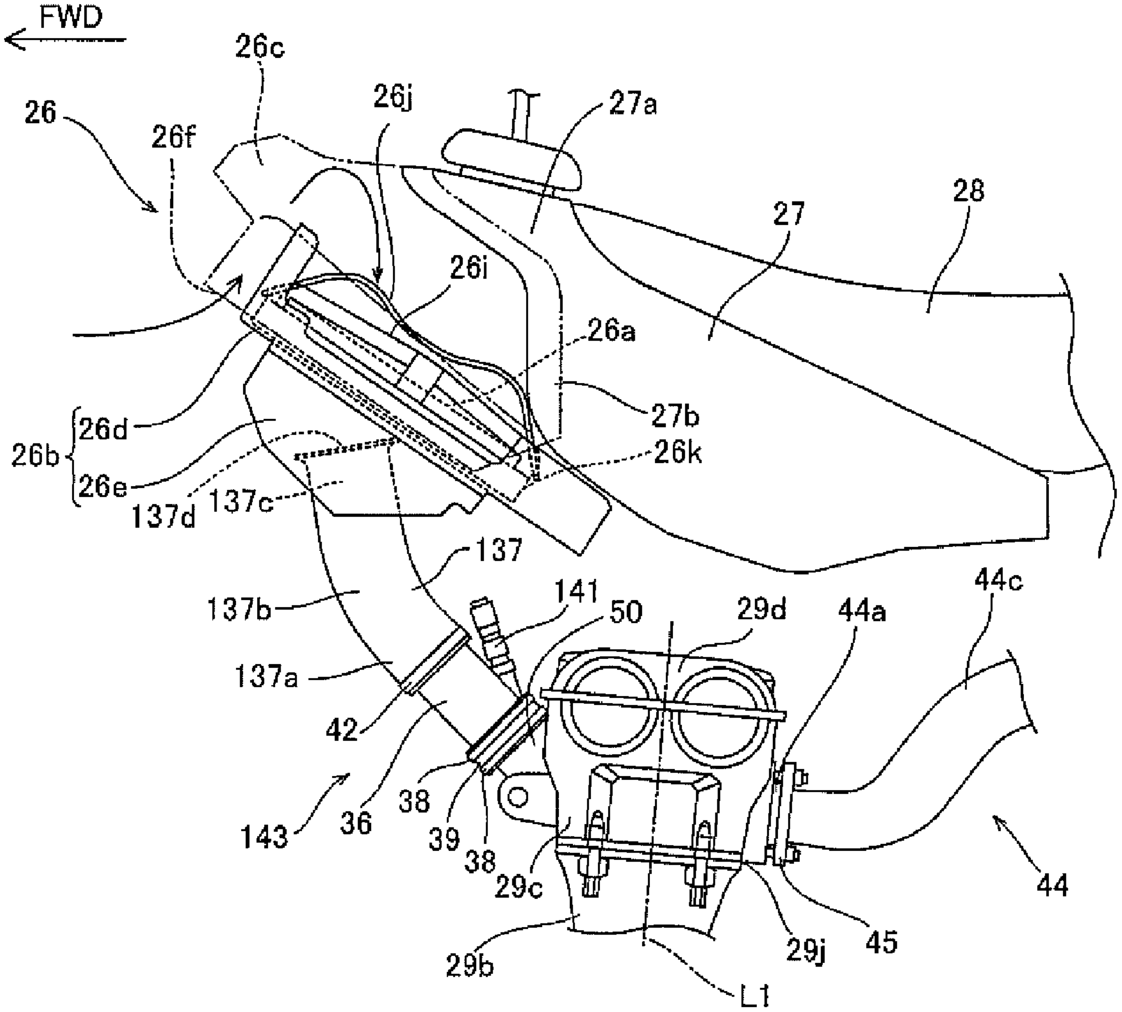
FIG. 8 is a side view of a portion of the motorcycle of FIG. 7 showing an engine, an intake pipe, an air cleaner and surroundings.

Engine 29 includes a crankcase 29*a*, a cylinder 29*b* having a piston 33 disposed therein, a cylinder head 29*c* disposed above cylinder 29*b* and a cylinder head cover 29*d* (FIGS. 3 and 8). Cylinder head 29*c* has an intake port 29*e* extending forward, an exhaust port 29*f* extending rearward, and a combustion chamber 29*g* to which intake port 29*e* and exhaust port 29*f* are connected. An intake valve 34 opens or closes intake port 29*e* and an exhaust valve 35 opens or closes exhaust port 29*f*.

Figure 6:
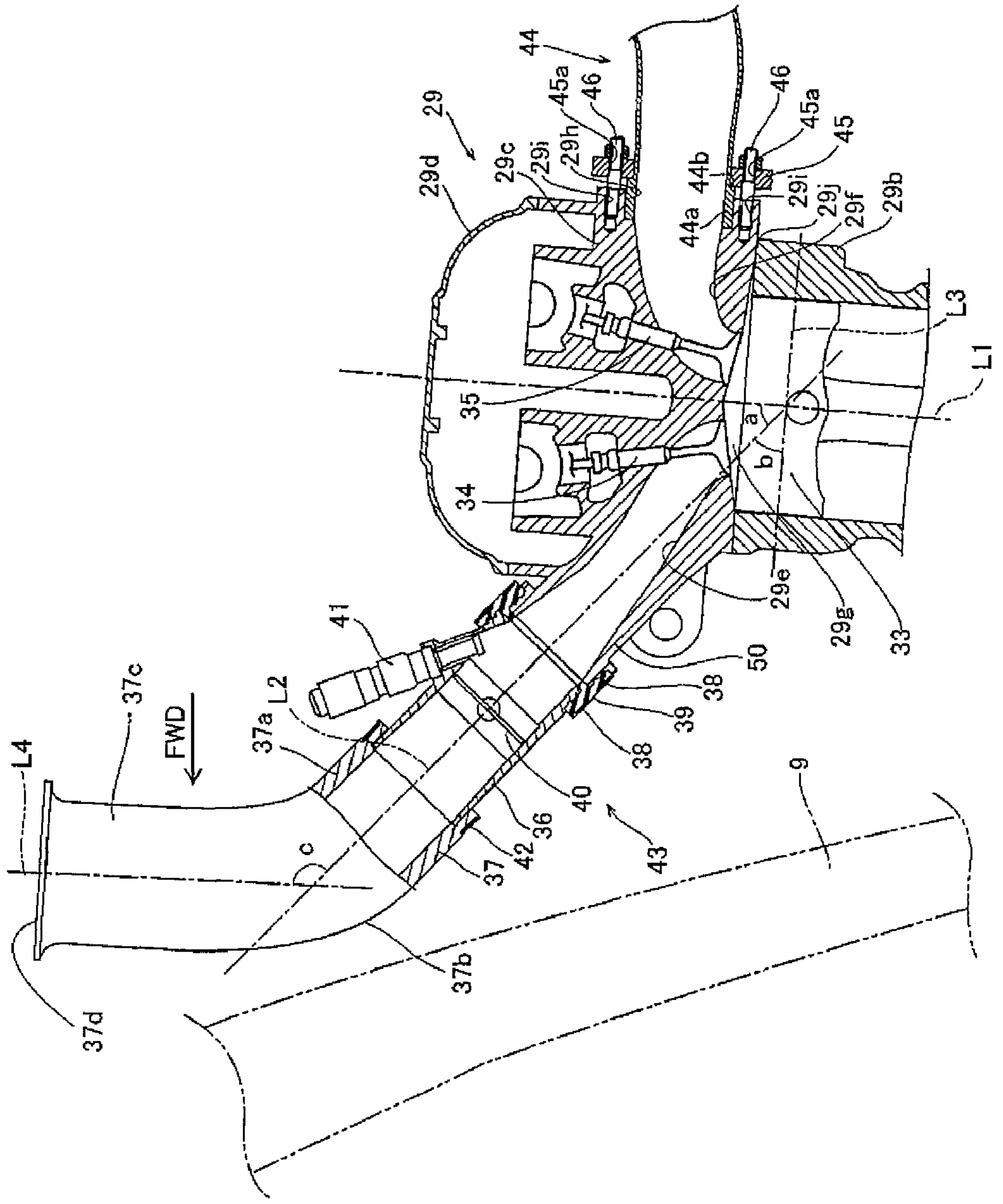
FIG. 6 is a sectional view of the engine of the motorcycle of FIG. 1.

A throttle body 36 and funnel 37 are connected through an engine connecting part 50 to intake port 29*e*. Funnel 37 is made of resin and extends in a more vertically upward direction than axis L2 of throttle body 36. Engine connecting part 50 inclines upward to the front to define an acute angle with respect to cylinder axis L1 of engine 29. As shown in FIG. 6, engine connecting part 50 is connected to intake port 29*e* such that axis L2, which extends on the forward side (arrow FWD direction side) of engine connecting part 50, and cylinder axis L1 define an acute angle (a). Engine connecting part 50 is an example of a "connecting part" of the present invention. In addition, engine connecting part 50 inclines upward relative to a straight line L3 by an angle (b), the straight line L3 being perpendicular to cylinder axis L1 of engine 29, the angle (b) being defined by straight line L3 and axis L2 of engine connecting part 50.

A rubber member 39 is attached on one end (a downstream side) to a forward end of engine connecting part 50 using a band member 38. Rubber member 39 couples engine connecting part 50 with throttle body 36. Throttle body 36 is fixed to the other end (upstream side) of rubber member 39 using another band member 38. Throttle body 36 extends in a straight form and is inclined substantially equally to engine connecting part 50. Throttle body 36 is an example of a "coupling part" of the present invention, and the engine connecting part 50 and the throttle body 36 are collectively an example of a "connecting assembly" of the present invention. A throttle valve 40 that adjusts the amount of air to flow through intake port 29*e* is disposed within throttle body 36.

A fuel injector 41 supplies fuel (gasoline) to engine 29 and is attached to throttle body 36. Fuel injector 41 is mounted on a rearward side of throttle body 36 relative to a forward side where down tube 9 is disposed. Funnel 37 supplies air flowing through air cleaner 26 to engine 29 and is fastened to throttle body 36 on its upstream side by means of a band member 42. Rubber member 39, throttle body 36 and funnel 37 form intake pipe 43. A lower part of intake pipe 43 is located between engine 29 and down tube 9. Funnel 37 is an example of a "funnel part" of the present invention.

An upstream part of intake port 29*e*, rubber member 39, throttle body 36 and a downstream part 37*a* of funnel 37 are in a straight form along an axis L2 that is inclined substantially equally to throttle body 36 (FIG. 6). Since the part of intake pipe 43 adjacent to engine 29 is in a straight form, air intake resistance is reduced, as compared to a case where the part of intake pipe 43 adjacent to engine 29 is curved or where a part of intake pipe 43 spaced apart from engine 29 is in a straight form. Performance of engine 29 is thereby improved.

Funnel 37 also includes a curved part 37*b* located upstream of downstream part 37*a*, and an upstream part 37*c* located upstream of curved part 37*b* and extending substantially right upward toward air cleaner 26 in a straight form. An axis L4 of upstream part 37*c* and axis L2, which is common to engine connecting part 50 and downstream part 37*a* of funnel 37, define an angle (c). Angle (c) is defined by axis L4 and axis L2 to be closer to 180° by angle (b) by which axis L2 is inclined upward relative to straight line L3 that is perpendicular to cylinder axis L1 of engine 29. An upper part of upstream part 37*c* is located within cleaner case 26*b* of air cleaner 26.

In the first embodiment of the invention, as shown in FIG. 4, a rear end 26*k* of filter element 26*a* of air cleaner 26 is rearward of a top end 37*d* of funnel 37 to create a certain gap between filter element 26*a* and top end 37*d* of funnel 37. Rear end 26*k* of filter element 26*a* is also located below top end 37*d* of funnel 37. In other words, filter element 26*a* and funnel 37 partly overlap each other in the vehicle height direction. This ensures the length of intake pipe 43 and that of funnel 37, while filter element 26*a* is not located not too high.

An exhaust pipe 44 is connected to exhaust port 29*f* formed on the rearward side of cylinder head 29*c*. Two screw holes 29*i* and recesses 29*h* are formed adjacent to exhaust port 29*f*. A connecting part 44*a* of exhaust pipe 44 is inserted into recess 29*h*. A step 44*b* is formed at a downstream end of connecting part 44*a* to attach a fixing member 45 to step 44*b*. Stud bolts 46 are screwed into screw holes 45*a* of fixing member 45 and screw holes 29*i* of cylinder head 29*c* to fasten fixing member 45 to cylinder head 29*c*. In this manner, exhaust pipe 44 is fixed to cylinder head 29*c*.

A part of exhaust pipe 44 adjacent to cylinder head 29*c* is substantially in a straight form, which reduces resistance of air exhausted from engine 29, as compared to a case where the part of exhaust pipe 44 adjacent to engine 29 is curved or where a part of exhaust pipe 44 spaced apart from engine 29 is in a straight form. Performance of engine 29 is thereby improved.

As shown in FIG. 3, a portion 44*c* of exhaust pipe 44 connected to the straight-form part adjacent to engine 29 extends upward to the rear. A coil-form part 44*d* connected to portion 44*c* extends upward to the rear and a rear part 44*e* downstream of coil-form part 44*d* extends upward to the rear. When viewed from above, coil-form part 44*d* is located between left and right seat rails 7*a* and 7*b* (FIG. 2). In addition, as shown in FIG. 3, coil-form part 44*d* is located in a region between rear suspension 23 and tire house A of rear wheel 21. A connecting part 44*f* of exhaust pipe 44 is connected to muffler 47 located above and behind engine 29. Muffler 47 is supported by right rail 7*b* (see FIG. 2) through a support plate 48. Muffler 47 is an example of a "silencer" of the present invention.

An axis of connection between exhaust pipe 44 and muffler 47 is higher than an axis of connection between exhaust pipe 44 and engine 29. Both the axes of connection between exhaust pipe 44 and muffler 47 and engine 29 are higher than rear end 29*j* (top surface) of cylinder 29*b*. All parts of exhaust pipe 44 are higher than axle 20, rear arm 19, and crankcase 29*a* of engine 29.

As described, in the first embodiment of the invention, intake pipe 43 is provided with engine connecting part 50 and funnel 37, engine connecting part 50 being connected to the front part of engine 29 such that it is inclined upward to the front to define acute angle (a) with respect to cylinder axis L1 of engine 29, and funnel 37 extending upward to the front. Thus, funnel 37 is not curved as sharply as in the case where engine connecting part 50 of intake pipe 43 is attached perpendicular to cylinder axis L1 of engine 29. Increase flow resistance of air drawn into engine 29 and decreased intake efficiency of engine 29 are thereby prevented. In addition, engine connecting part 50 is connected to the front part of engine 29 such that it inclines upward to the front to define acute angle (a) with respect to cylinder axis L1 of engine 29. Thus, the distance between down tube 9 and engine 29 is shorter, compared to a case where engine connecting part 50 of intake pipe 43 is attached perpendicular to cylinder axis L1 of engine 29. This prevents an increase in vehicle length. Further, funnel 37 extends in a more vertical direction than axis L2 of throttle body 36. This prevents funnel 37 from extending forward where down tube 9 is disposed, and therefore, ensures the length of intake pipe 43, while preventing the length of intake pipe 43 from increasing in the longitudinal direction. This eliminates the necessity of increasing the distance between down tube 9 and engine 29 for the purpose of avoiding contact between down tube 9 and funnel 37. Therefore, an increased length of motorcycle 1 is prevented. Intake pipe 43 can be formed longer, compared to a case where intake pipe 43 is in a straight form extending from the front part of engine 29 toward top end 37*d* of funnel 37. Therefore, performance of engine 29 improves particularly during low and medium-speed driving.

In addition, in the first embodiment of the invention, as described above, throttle body 36 has an inclination angle substantially equal to the inclination angle of engine connecting part 50. Flow resistance of air flowing through throttle body 36 and engine connecting part 50 is thereby reduced, as compared to a case where throttle body 36 and engine connecting part 50 are formed individually with different inclinations.

Further, in the first embodiment of the invention, as described above, the rear part of filter element 26*a* of air cleaner 26 is oriented with its rear part inclined downward. This prevents the rear part of filter element 26*a* from contacting side overlying part 27*b* of fuel tank 27, while allowing filter element 26*a* to extend rearward. Thereby, the area of filter element 26*a* increases.

Still further, in the first embodiment of the invention, as described above, opening 26*f* of air cleaner 26 is located above funnel 37. Opening 26*f* is thus located at an upper position apart from engine 29 or a heat source, resulting in a lower temperature of air passing from opening 26*f* of air cleaner 26 through intake pipe 43. Thereby, the density of air drawn into engine 29 increases, and intake efficiency of engine 29 improves.

Still further, in the first embodiment of the invention, as described above, rear end 26*k* of filter element 26*a* is rearward of top end 37*d* of funnel 37. Therefore, a certain gap is created between filter element 26*a* and top end 37*d* or an opening of funnel 37. This avoids a case where there is a short distance between funnel 37 and filter element 26*a* designed to disperse the flow of air entering from opening 26*f* of air cleaner 26.

Still further, in the first embodiment of the invention, as described above, rear end 26*k* of filter element 26*a* is below top end 37*d* of funnel 37. Therefore, filter element 26*a* and funnel 37 partly overlap in the vehicle height direction. The height of motorcycle 1 can thereby be smaller by an amount of the overlap between filter element 26*a* and funnel 37 in terms of height position.

Still further, in the first embodiment of the invention, as described above, filter element 26*a* has overlying parts 26*g* and 26*h* that lie over right and left tank rails 4*a* and 4*b*. The size of filter element 26*a* can thus be larger in the vehicle width direction by overlying parts 26*g* and 26*h*.

Second Embodiment

Figure 7:
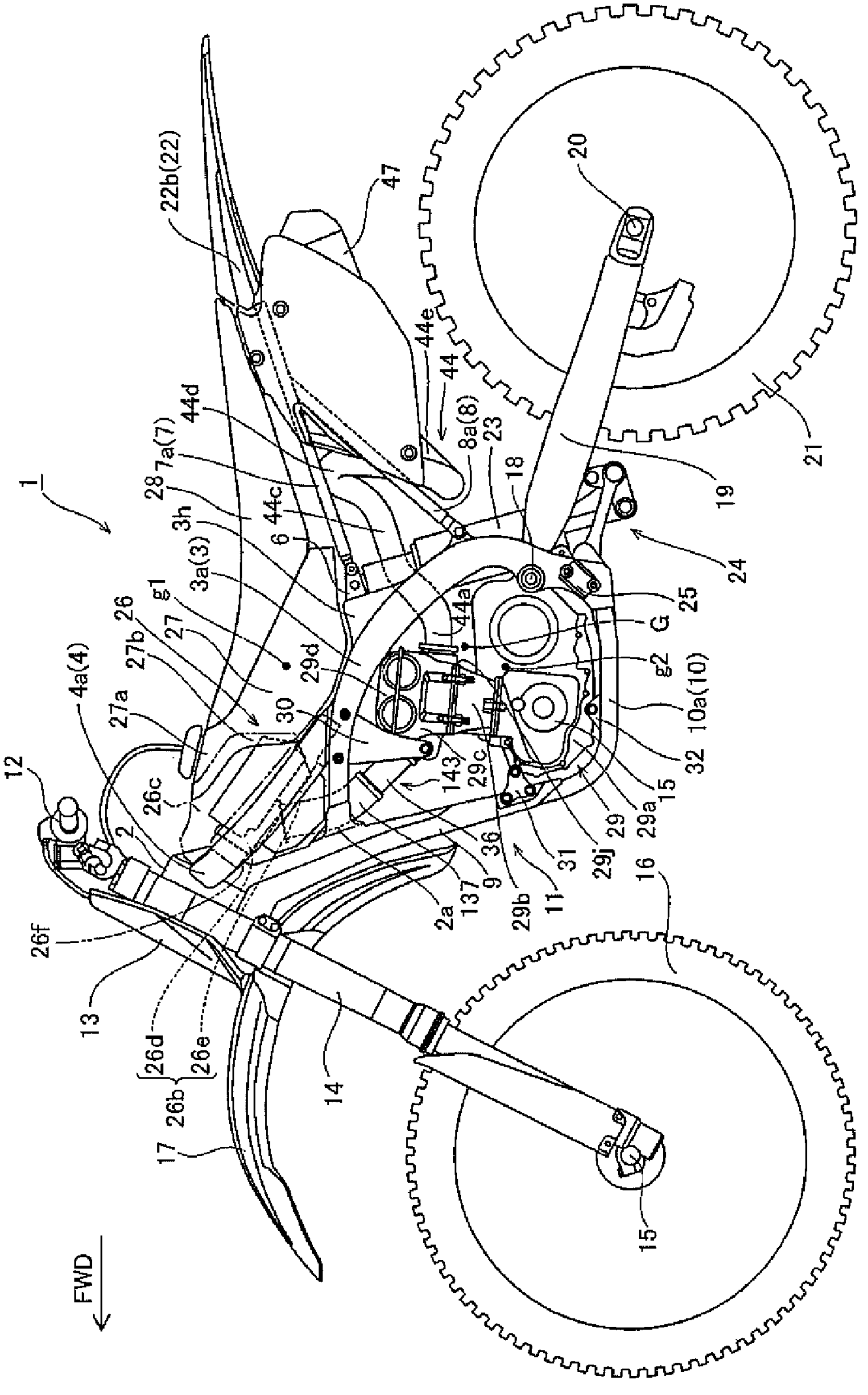
FIG. 7 is a side view of a motorcycle according to a second embodiment of the present invention.
Figure 9:
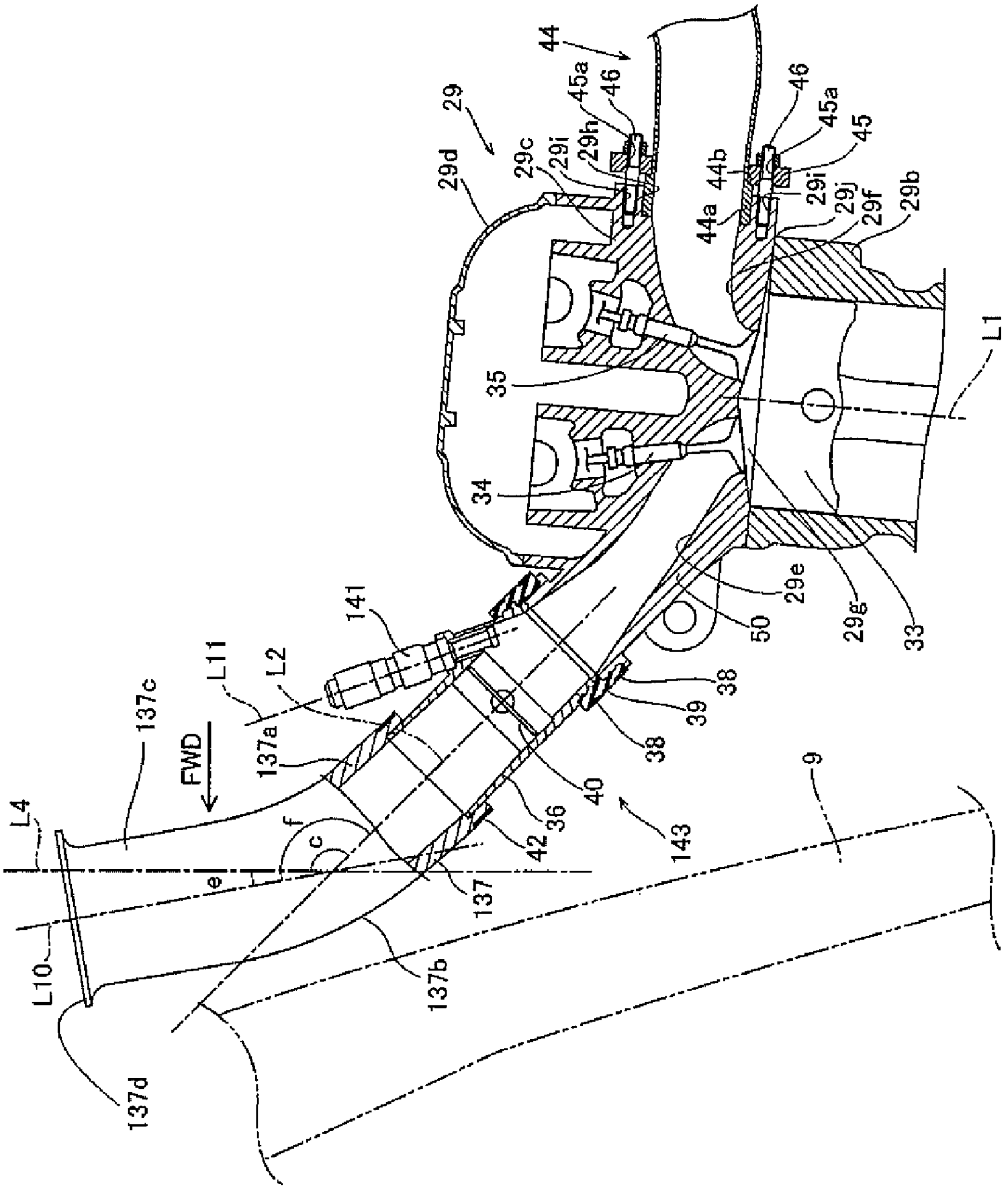
FIG. 9 is a sectional view of the engine of the motorcycle of FIG. 7.

FIG. 7 is a side view s of a motorcycle according to a second embodiment of the present invention. FIGS. 8 and 9 illustrate the location of a funnel of the motorcycle shown in FIG. 7. The structure of an intake pipe according to the second embodiment of the present invention is described with reference to FIGS. 7-9. In the second embodiment, an upstream part 137*c* of a funnel 137 extends upward from throttle body 36 to the front.

In the second embodiment of the invention, as shown in FIGS. 7-9, an intake pipe 143 has funnel 137 whose upstream part 137*c* (FIGS. 8 and 9) is inclined forward by an angle (e). As shown in FIG. 9, an axis L10 of upstream part 137*c* and axis L2 of engine connecting part 50 and throttle body 36 define angle (f). Angle (f) is larger than angle (c), which is formed by axis L4 and axis L2 (FIG. 6) in the first embodiment, by an angle (e) by which upstream part 137*c* of funnel 137 is inclined forward. In other words, upstream part 137*c* of funnel 137 is formed such that axis L10 and axis L2 define angle (f) closer to 180°, compared to the first embodiment of the invention.

In the second embodiment of the invention, as shown in FIG. 9, an injector 141 is oriented such that an axis L11 of injector 141 is substantially parallel to axis L10 of upstream part 137*c* of funnel 137.

Other parts of the structure of the second embodiment are same as those of the first embodiment.

In the second embodiment, as described above, funnel 137 is oriented with its upstream part 137*c* inclined forward by angle (e). This allows upstream part 137*c* of funnel 137 to be formed such that axis L10 of upstream part 137*c*, and axis L2 of engine connecting part 50 and throttle body 36 define angle (f) to be closer to 180°. Thus, funnel 137 is not curved as much as funnel 37 in the first embodiment, and extends upward. Consequently, increased flow resistance of air drawn into engine 29 and passing through funnel 137, and decreased intake efficiency of engine 29, are prevented.

It should be understood that the embodiments disclosed herein are illustrative in all respects, and do not impose any limitation. The scope of the invention is defined by the claims rather than by the described embodiments, and includes all modifications falling within the scope of the claims and equivalents thereof.

The present invention has been described as applied to a motorcycle. However, the present invention is not limited to that, and may be applicable to other vehicles such as, for example, an automobile, a bicycle, a tricycle, and an all terrain vehicle (ATV). The invention is also not limited to an off-road motorcycle, and may be applicable to an on-road motorcycle.

Further, the engine has been described as oriented with its cylinder axis angled rearward by approximately 5 degrees. However, the present invention is not so limited, and the engine may be oriented with its cylinder axis angled rearward by more than 5 degrees.

The invention claimed is:

1. A vehicle comprising:

a head pipe;

an engine disposed with a cylinder axis thereof inclined rearward;

a lower frame located in front of the engine and extending downward from the head pipe toward a rear of the vehicle;

an intake pipe located between the lower frame and the engine and connected to a front portion of the engine, the intake pipe including:

a connecting assembly connected to the front portion of the engine and inclined upward toward a front of the vehicle to define an acute angle with respect to the cylinder axis of the engine; and a funnel portion connected to the connecting assembly and extending in a more vertically upward direction than an axis of the connecting assembly; wherein the connecting assembly of the intake pipe includes:

an engine connecting portion connected to the engine; and a coupling portion coupling the engine connecting portion with the funnel portion and having an inclination angle approximately equal to the inclination angle of the engine connecting portion.

2. The vehicle according to claim 1, wherein the coupling portion of the intake pipe includes a throttle valve therein.

3. The vehicle according to claim 1, wherein the funnel portion of the intake pipe has an upper portion that is inclined forward.

4. The vehicle according to claim 3, wherein the connecting assembly of the intake pipe further comprises a fuel injector mounted to the coupling portion of the intake pipe to inject fuel to the engine, wherein an axis of the fuel injector is approximately parallel to an axis of the upper portion of the funnel portion.

5. A vehicle comprising:

a head pipe;

an engine disposed with a cylinder axis thereof inclined rearward;

a lower frame located in front of the engine and extending downward from the head pipe toward a rear of the vehicle;

an intake pipe located between the lower frame and the engine and connected to a front portion of the engine, the intake pipe including:

a connecting assembly connected to the front portion of the engine and inclined upward toward a front of the vehicle to define an acute angle with respect to the cylinder axis of the engine; and a funnel portion connected to the connecting assembly and extending in a more vertically upward direction than an axis of the connecting assembly; and an air cleaner located in front of and above the engine, to which the funnel portion is connected; wherein the air cleaner includes a filter portion having a rear portion that is inclined downward; and the air cleaner further includes an opening disposed above the funnel portion arranged to introduce air into the air cleaner.

6. The vehicle according to claim 5, wherein a rear end of the filter portion is located rearward relative to a top end of the funnel portion.

7. The vehicle according to claim 6, wherein the rear end of the filter portion is lower than the top end of the funnel portion.

8. The vehicle according to claim 5, further comprising:

an upper frame extending rearward from the head pipe, wherein the filter portion has an overlying portion lying over the upper frame.

9. A vehicle comprising:

a head pipe;

an engine disposed with a cylinder axis thereof inclined rearward;

a lower frame located in front of the engine and extending downward from the head pipe toward a rear of the vehicle;

an intake pipe located between the lower frame and the engine and connected to a front portion of the engine, the intake pipe including:

a connecting assembly connected to the front portion of the engine and inclined upward toward a front of the vehicle to define an acute angle with respect to the cylinder axis of the engine; and a funnel portion connected to the connecting assembly and extending in a more vertically upward direction than an axis of the connecting assembly; wherein the funnel portion of the intake pipe is upstream of the connecting assembly, and includes:

a straight downstream portion;

a curved portion curved upward from the straight downstream portion toward the front of the vehicle; and an upstream portion extending upward from the curved portion.

10. The vehicle according to claim 9, wherein the downstream portion of the funnel portion of the intake pipe is connected to the connecting assembly.

11. The vehicle according to claim 9, wherein the vehicle is an off-road motorcycle.

* * * * *